United States Patent
Galvez et al.

(10) Patent No.: US 12,280,395 B2
(45) Date of Patent: Apr. 22, 2025

(54) PROCESS FOR FORMING A COATING

(71) Applicant: HENKEL AG & CO. KGAA, Duesseldorf (DE)

(72) Inventors: Miguel Galvez, Danvers, MA (US); Bong June Zhang, Chestnut Hill, MA (US)

(73) Assignee: Henkel AG & Co. KGaA, Duesseldorf (DE)

( * ) Notice: Subject to any disclaimer, the term of this patent is extended or adjusted under 35 U.S.C. 154(b) by 172 days.

(21) Appl. No.: 17/906,496

(22) PCT Filed: Jun. 22, 2020

(86) PCT No.: PCT/US2020/038875
§ 371 (c)(1),
(2) Date: Sep. 16, 2022

(87) PCT Pub. No.: WO2021/188135
PCT Pub. Date: Sep. 23, 2021

(65) Prior Publication Data
US 2023/0057529 A1 Feb. 23, 2023

(30) Foreign Application Priority Data
Mar. 18, 2020 (CN) .......................... 202010191195.8

(51) Int. Cl.
*B05D 1/02* (2006.01)
*B05D 3/02* (2006.01)
(Continued)

(52) U.S. Cl.
CPC ............. *B05D 1/02* (2013.01); *B05D 3/0272* (2013.01); *B05D 3/107* (2013.01); *C03C 17/30* (2013.01);
(Continued)

(58) Field of Classification Search
CPC ........ B05D 1/02; B05D 3/0272; B05D 3/107; C09D 7/20; C09D 5/021; C09D 183/06; C03C 17/30; C03C 2217/70; C03C 2218/112; C08G 77/045; B05B 7/1606; B05B 7/1686
(Continued)

(56) References Cited

U.S. PATENT DOCUMENTS

| | | | | |
|---|---|---|---|---|
| 2011/0129665 A1* | 6/2011 | Botelho | ............. | G02B 27/0006 427/427 |
| 2015/0267072 A1* | 9/2015 | Huang | ...................... | B05D 5/08 427/600 |
| 2017/0137635 A1* | 5/2017 | Zhang | ..................... | B05D 3/142 |
| 2017/0183257 A1* | 6/2017 | Apitz | ....................... | C03C 3/07 |

(Continued)

FOREIGN PATENT DOCUMENTS

| | | |
|---|---|---|
| CN | 102151828 A | 8/2011 |
| WO | 2019227010 A1 | 11/2019 |

OTHER PUBLICATIONS

Office Action; Chinese Patent Application No. 202010191195.8; May 30, 2022.
(Continued)

*Primary Examiner* — Brian K Talbot
(74) *Attorney, Agent, or Firm* — Steven C. Bauman

(57) ABSTRACT

A process for forming a coating on a substrate including atomizing a formulation and applying the formulation to a substrate to form a coating on a substrate.

16 Claims, 1 Drawing Sheet

(51) Int. Cl.
*B05D 3/10* (2006.01)
*C03C 17/30* (2006.01)
*C08G 77/04* (2006.01)
*C09D 5/02* (2006.01)
*C09D 7/20* (2018.01)
*C09D 183/06* (2006.01)

(52) U.S. Cl.
CPC ........... *C08G 77/045* (2013.01); *C09D 5/021* (2013.01); *C09D 7/20* (2018.01); *C09D 183/06* (2013.01); *C03C 2217/70* (2013.01); *C03C 2218/112* (2013.01)

(58) Field of Classification Search
USPC .......................................... 427/352; 239/138
See application file for complete search history.

(56) References Cited

U.S. PATENT DOCUMENTS

| | | | | |
|---|---|---|---|---|
| 2017/0349785 | A1* | 12/2017 | Galvez | C09D 183/04 |
| 2018/0171154 | A1* | 6/2018 | Lu | G02B 1/11 |
| 2018/0340075 | A1* | 11/2018 | Harkal | B82Y 30/00 |
| 2019/0367773 | A1* | 12/2019 | Galvez | C09D 5/00 |
| 2020/0048495 | A1* | 2/2020 | Galvez | C09D 5/00 |
| 2022/0234947 | A1* | 7/2022 | Adib | C09D 183/06 |

OTHER PUBLICATIONS

Search Report and Written Opinion; International Patent Application No. PCT/US2020/038875; Oct. 29, 2020.
International Preliminary Report on Patentability; International Patent Application No. PCT/US2020/038875; Sep. 29, 2022.
Office Action and Search Report; Taiwan Patent Application No. 109123582; Jul. 4, 2024.

* cited by examiner

PROCESS FOR FORMING A COATING

CROSS-REFERENCE TO RELATED APPLICATIONS

This application is a U.S. National Phase of International Patent Application No. PCT/US2020/038875, filed Jun. 22, 2020, which claims the benefit of Chinese Patent Application No. 202010191195.8, filed Mar. 18, 2020, the entire disclosures of which are herein incorporated by reference in their entireties.

FIELD

The present disclosure relates, in exemplary embodiments, to processes for forming coatings on substrates.

BACKGROUND

Anti-fingerprint coatings can be applied to surfaces to minimize the appearance of a fingerprint after the surface has been touched. Some anti-fingerprint coatings comprise fluorinated polyether silanes (fluorosilanes). These fluorosilane coatings can be monolayers and are typically less than 10 nm thick.

For fluorosilane coatings, the processing parameters are well known across the industry and have been manufactured at scale. However, recent development in coating technologies has introduced invisible fingerprint coatings, which may offer improved fingerprint hiding when compared to fluorosilane coatings. Some invisible fingerprint coatings are more difficult to coat. Thus, there is a need for optimized invisible fingerprint coatings and methods for making such coatings.

SUMMARY

The following presents a simplified summary in order to provide a basic understanding of some aspects of various invention embodiments. The summary is not an extensive overview of the invention. It is intended neither to identify key or critical elements of the invention nor to delineate the scope of the invention. The following summary merely presents some concepts of the invention in a simplified form as a prelude to the more detailed description below.

The present disclosure relates, in exemplary embodiments, to compositions and formulations for providing invisible fingerprint coatings. The present disclosure also relates to processes for forming invisible fingerprint coatings on a substrate, such as, but not limited to, a substrate made of a glass material, a ceramic, or metal oxide surface.

Other features will become apparent upon reading the following detailed description of certain exemplary embodiments, when taken in conjunction with the appended claims. The following numbered clauses include embodiments that are contemplated and non-limiting:

Clause 1. A process for forming a coating layer on a substrate, the process comprising
  (a) providing a substrate having a substrate surface;
  (b) providing a formulation comprising a halogenated alkyl silane and a solvent;
  (c) atomizing the formulation with a nozzle at an atomization pressure of about 20 kPa to about 2,000 kPa and at a flow rate of about 1 ml/min to about 50 ml/min to form an atomized formulation; and
  (d) applying the atomized formulation to the substrate surface that is about 1 cm to about 50 cm away from the nozzle,
  wherein the coating layer has a water contact angle less than about 100°.

Clause 2. The process of clause 1, wherein the substrate comprises glass, anti-reflective coated glass, adhesion-primed glass, metal, hard coated metal, plastic, or hard coated plastic.

Clause 3. The process of any of the preceding clauses, wherein the coating layer is about 0.1 nm to about 500 nm thick.

Clause 4. The process of any of the preceding clauses, wherein the coating layer is about 0.1 nm to about 100 nm thick.

Clause 5. The process of any of the preceding clauses, the coating layer is about 0.1 nm to about 20 nm thick.

Clause 6. The process of any of the preceding clauses, wherein the coating layer has a diiodomethane contact angle of about 20° to about 50°.

Clause 7. The process of any of the preceding clauses, wherein the coating layer has a diiodomethane contact angle of about 25° to about 45°.

Clause 8. The process of any of the preceding clauses, wherein the water contact angle is about 80° to about 100°.

Clause 9. The process of any of the preceding clauses, wherein the coating layer maintains a water contact angle above 50 degrees after 3,000 cycles of eraser abrasion.

Clause 10. The process of any of the preceding clauses, wherein the halogenated alkyl silane is present in the formulation at about 0.1% to about 10% by weight of the formulation.

Clause 11. The process of any of the preceding clauses, wherein the halogenated alkyl silane is present in the formulation at about 0.1% to about 5% by weight of the formulation.

Clause 12. The process of any of the preceding clauses, wherein the halogenated alkyl silane is present in the formulation at about 0.1% to about 1% by weight of the formulation.

Clause 13. The process of any of the preceding clauses, wherein the atomization pressure is about 50 kPa to about 1,000 kPa.

Clause 14. The process of any of the preceding clauses, wherein the atomization pressure is about 100 kPa to about 300 kPa.

Clause 15. The process of any of the preceding clauses, wherein the distance from the nozzle to the substrate is about 5 cm to about 20 cm.

Clause 16. The process of any of the preceding clauses, wherein the distance from the nozzle to the substrate is about 8 cm to about 15 cm.

Clause 17. The process of any of the preceding clauses, wherein the step of providing is performed at a flow rate of about 5 ml/min to about 20 ml/min.

Clause 18. The process of any of the preceding clauses, wherein the step of providing is performed at a flow rate of about 8 ml/min to about 15 ml/min.

Clause 19. The process of any of the preceding clauses, wherein the solvent comprises an alcohol.

Clause 20. The process of any of the preceding clauses, wherein the alcohol is ethanol.

Clause 21. A process for forming a coated substrate, the process comprising
  atomizing a formulation through a tip of a nozzle at a pressure of at least 100 kPa to form an atomized formulation, and coating a surface of a substrate with the atomized formulation,
wherein the distance from the tip of the nozzle to the surface of the substrate is at least 1 cm; and
wherein the coated substrate has a water contact angle less than 100°.

Clause 22. The process of clause 21, wherein the water contact angle of the coated substrate is about 80° to about 100°.

Clause 23. The process of clause 21 or 22, wherein the process further comprises heating the sprayed substrate to a temperature of at least 90° C. to form a cured substrate.

Clause 24. The process of any of clauses 21-23, wherein the step of heating is performed for about 10 minutes to about 90 minutes.

Clause 25. The process of any of clauses 21-24, wherein the process further comprises cleaning the cured substrate.

Clause 26. The process of any of clauses 21-25, wherein the nozzle pressure is about 100 kPa to about 450 kPa.

Clause 27. The process of any of clauses 21-26, wherein the nozzle pressure is about 150 kPa to about 250 kPa.

Clause 28. The process of any of clauses 21-26, wherein the distance from the nozzle tip to the substrate is about 7 cm to about 15 cm.

Clause 29. The process of any of clauses 21-28, wherein the formulation comprises a halogenated alkyl silane.

Clause 30. The process of any of clauses 21-29, wherein the formulation comprises about 0.1% to about 1% halogenated alkyl silane.

Clause 31. The process of any of clauses 21-30, wherein the formulation comprises a chloroalkyl silane.

Clause 32. The process of any of clauses 21-31, wherein the formulation has a pH of less than about 5.

Clause 33. The process of any of clauses 21-32, wherein the formulation comprises a hydroxy POSS.

Clause 34. The process of any of clauses 21-33, wherein the water contact angle is about 60° to about 95° after 3,000 cycles with an eraser abrasion.

Clause 35. The process of any of clauses 21-34, wherein the formulation comprises an alcohol.

Clause 36. The process of any of clauses 21-35, wherein the alcohol is ethanol.

DETAILED DESCRIPTION

Figure 1:
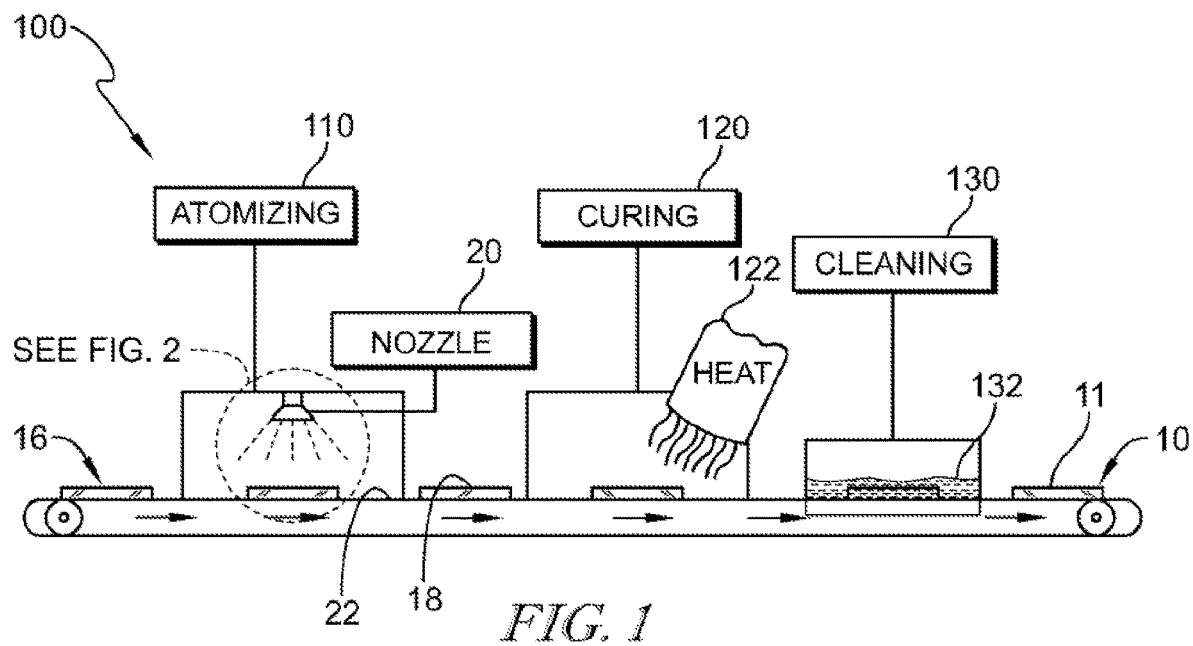
FIG. 1 shows an exemplary process of forming an invisible-fingerprint coating on a substrate.
Figure 2:
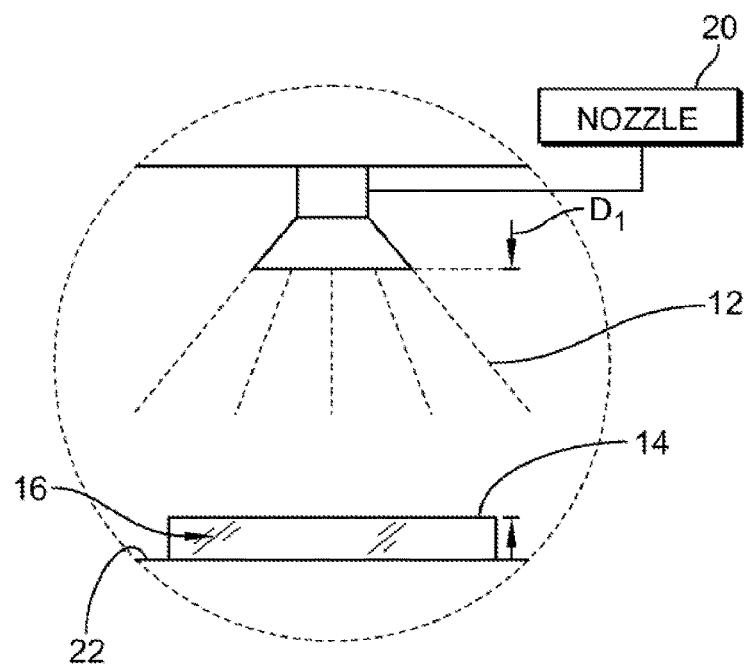
FIG. 2 shows an enlarged view of a portion of FIG. 1, showing the nozzle applying a formulation as described herein to the surface of the substrate.

Described herein is a method 100 for forming a coated substrate 10, as shown in FIG. 1. In some embodiments, the method 100 atomizes 110 a formulation 12 from a nozzle 20, as shown in FIG. 2. The atomized formulation contacts a surface 14 of a substrate 16. In some embodiments, the method 100 uses high atomization pressures and nozzle distances from the substrate 16. It has been discovered that if the atomization pressures are too low or nozzle distances are not long enough, then droplet sizes may be large. Without being bound by theory, it has been shown that large droplets may create areas on the surface 14 which are too thick, and may result in excess material that may be difficult to clean.

Anti-fingerprint coatings based on fluorosilanes have been applied via atomized spray systems as described in U.S. Pat. No. 8,932,670. Because these coatings are typically monolayer type coatings with coating thicknesses less than 10 nm, low atomization pressure and short nozzle distances are required. The fluorosilane coatings in U.S. Pat. No. 8,932,670 have been shown to provide a surface having a water contact angle of greater than 100° and an oil contact angle greater than 70°. Such surfaces may provide an ease of cleaning but poorly hide fingerprints.

A coated substrate 10 in accordance with the present disclosure may comprise a surface 14 coated with a non-fluorinated fingerprint-resistant coating 11. Illustratively, the coated substrate 10 may be formed by a process 100 comprising atomizing 110 a formulation 12. In some embodiments, the formulation 12 comprises a halogenated alkyl silane. In some embodiments, the formulation 12 does not include a fluorosilane. In some embodiments, the formulation 12 comprises a POSS, an adhesion promotor, additives, or a combination thereof.

As described herein, the coated substrate 10 may demonstrate hide fingerprints as determined using a colorimeter and measuring the delta E after fingerprint the surface. In some embodiments, the delta E is less than about 2. In some embodiments, the coated substrate 10 resists abrasion as measured by retention of the water contact angle.

In exemplary embodiments, the substrate 16 may be a glass screen, for example as used in electronic displays, such as, but not limited to, cell phone screens, computer monitors, television screens, touch screens, appliances, heads-up displays, glasses (e.g., eyeglasses and sunglasses), masks (e.g., welding masks), and the like. In exemplary embodiments, the substrate 16 may be used in appliance equipment and cosmetic finishes fields, for example decorative panels for appliances such as domestic electrical equipment (refrigerator doors, oven doors, display cases, etc.). The substrate 16 may be made of glass (or a screen protector, typically a polymeric plastic), glass ceramic, metal oxide, Plexiglas or other material. In some embodiments, the substrate 16 comprises a glass, a glass ceramic, a metal oxide, or a plastic.

In illustrative embodiments the method 100 comprises the step of atomizing 110 the formulation 12, as shown in FIG. 1. In some embodiments, the formulation 12 is passed through a nozzle 20. Illustratively, the formulation 12 is passed through the nozzle 20 at a particular atomization pressure as measured at the tip of the nozzle 20. In some embodiments, the atomization pressure is at least about 20 kPa, at least about 100 kPa, at least about 125 kPa, or at least about 150 kPa. In some embodiments, the nozzle pressure is in a range of about 20 kPa to about 2,000 kPa, about 20 kPa to about 1,000 kPa, about 50 kPa to about 1,000 kPa, about 100 kPa to about 500 kPa, about 100 kPa to about 450 kPa, about 100 kPa to about 300 kPa, about 150 kPa to about 300 kPa, or about 150 kPa to about 250 kPa.

In illustrative embodiments, the step of atomizing 110 is comprises providing the formulation 12 to the nozzle 20 at a particular flow rate to form a sprayed substrate 18. In some embodiments, the flow rate is at least 1 ml/min or at least 5 ml/min. In some embodiments, the flow rate is less than about 50 ml/min, less than about 20 ml/min or less than about 15 ml/min. In illustrative embodiments, the flow rate is about 1 ml/min to about 50 ml/min, about 1 ml/min to about 20 ml/min, or about 5 ml/min to about 20 ml/min.

In some embodiments, the nozzle 20 is a particular distance D1 from the substrate, as shown in FIG. 2. In some embodiments, D1 is at least 1 cm, at least about 5 cm, or at least about 7 cm. In some embodiments, D1 is in a range of about 1 cm to about 50 cm, about 5 cm to about 20 cm, about 5 cm to about 15 cm, about 7 cm to about 15 cm, or about 8 cm to about 15 cm.

In some embodiments, step of atomizing 110 is performed with a particular nozzle scan speed. The nozzle-scan speed is the speed at which the nozzle 20 moves across the conveyor belt 22. In some embodiments, the nozzle scan speed is at least about 200 mm/s or at least about 400 mm/s. In some embodiments, the nozzle scan speed is about 250 mm/s to about 1,000 mm/s or about 700 mm/s to about 1,000 mm/s.

In some embodiments, the method 100 further comprises curing 120 the sprayed substrate 18. In some embodiments, the step of treating comprises heating the sprayed substrate, cleaning the sprayed substrate, or a combination thereof.

In some embodiments, the step of curing 120 the sprayed substrate 18 comprises heating 122 the sprayed substrate. Illustratively, the step of heating 122 can be performed in an oven or any suitable alternative means to cure the sprayed substrate 18. In some embodiments, the step of heating is performed at a temperature of at least 90° C. or at least 100° C. In some embodiments, the step of heating is performed at a temperature in range of about 100° C. to about 250° C. or about 100° C. to about 200° C. In some embodiments, the step of heating 122 is performed at a temperature of about 100° C., about 125° C., about 150° C., about 175° C., about 200° C., about 225° C., or about 250° C.

The step of heating 122 can be performed for a particular length of time. In some embodiments, the step of heating 122 is performed for at least 10 minutes or at least 30 minutes. In some embodiments, the step of heating 122 is performed for about 10 minutes to about 2 hours, about 10 minutes to about 90 minutes, about 30 minutes to about 90 minutes, about 30 minutes to about 60 minutes, or about 40 minutes to about 60 minutes.

In some embodiments, the method 100 comprises the step of cleaning 130 the sprayed substrate 18, as shown in FIG. 1. The step of cleaning 130 can be performed by conveyor cleaning, ultrasonic cleaning, or any suitable alternative means. Illustratively, ultrasonic cleaning is a water bath whereby the glass is immersed in a bath of water and then sonicated by sonicator. The sonicator creates vibrations in the water that clean the sprayed substrate 18, as suggested in FIG. 1. In some embodiments, the sprayed substrate 18 is sonicated between about 30 to about 60 minutes and preferably at about 30° C. to about 40° C.

In some embodiments, conveyor cleaning is performed by a glass cleaning machine where there is a conveyor belt and the sprayed substrate 18 goes through several wash steps. In some embodiments, the wash steps can include but are not limited to water washes, soap washes, detergent washes, and combinations thereof.

In some embodiments, the step of cleaning 130 is performed after the step of curing 120. In some embodiments, the method 100 does not include a step of heating 122. In some embodiments, the method 100 comprises a step of cleaning 130 prior to a step of curing 120. In some embodiments, the method 100 comprises at least 1 or at least 2 steps of cleaning 130.

In illustrative embodiments, coated substrate 10 has a particular water contact angle, oil contact angle (as measured by diiodomethane), or both. In some embodiments, the water contact angle is in the range of about 65° to about 95° or about 70° to about 85°. In some embodiments, the oil contact angle is in the range of about 25° to about 40° or about 35° to about 40°. In some embodiments, the water contact angle is in the range of about 65° to about 95° or about 70° to about 85° and the diiodomethane is in the range of about 25° to about 40°. In some embodiments, the coating 11 is described as the coating layer.

The coating 11 of coated substrate 10 can have a particular thickness. In some embodiments, the thickness of the coating 11 is about 0.5 nm, about 1 nm, about 2 nm, about 4 nm, about 8 nm, about 10 nm, about 12 nm, about 14 nm, about 16 nm, about 18 nm, about 20 nm, about 22 nm, about 24 nm, about 26 nm, about 28 nm, about 30 nm, about 32 nm, about 34 nm, about 36 nm, about 38 nm, about 40 nm, about 42 nm, about 44 nm, about 46 nm, about 48 nm, about 50 nm, about 100 nm, about 200 nm, about 300 nm, about 400 nm, or about 500 nm thick. In some embodiments, the thickness of the coating 11 is in a range about 0.1 nm to about 500 nm thick, about 0.1 nm to about 100 nm, about 2 nm to about 50 nm, or about 4 nm to about 10 nm thick.

In some embodiments, the coated substrate 10 has an initial oil angle using diiodomethane ($CH_2I_2$) as measured according to the Examples. In some embodiments, the initial oil angle is less than about 60°, less than about 50°, less than about 45°, less than about 40°, less than about 35°, or less than about 30°. In some embodiments, the initial oil angle of the fingerprint-resistant surface is about 20°, about 21°, about 22°, about 23°, about 24°, about 25°, about 26°, about 27°, about 28°, about 29°, about 30°, about 31°, about 32°, about 33°, about 34°, about 35°, about 37°, about 40°, about 45°, about 50°, about 55°, or about 60°. In some embodiments, the initial oil angle of the fingerprint-resistant surface may be in a range of about 20° to about 60°, about 20° to about 50°, about 25° to about 45°, about 20° to about 40°, about 20° to about 35°, about 20° to about 30°, about 30° to about 40° or about 35° to about 40°.

In some embodiments, the coated substrate 10 has an initial water angle as measured according to the Examples. In some embodiments, the initial water angle is greater than about 60°, greater than about 65°, greater than about 75°, greater than about 80°, or greater than about 90°. In some embodiments, the initial water angle is less than about 100°, less than about 95°, or less than about 80°. In some embodiments, the initial water angle is about 60°, about 65°, about 70°, about 75°, about 76°, about 77°, about 78°, about 79°, about 80°, about 81°, about 82°, about 83°, about 84°, about 85°, about 86°, about 87°, about 88°, about 89°, about 90°, or about 95°. In some embodiments, the initial water angle is in a range of about 60° to about 115°, about 60° to about 110°, about 60° to about 100°, about 60° to about 95°, about 65° to about 95°, about 70° to about 95°, about 75° to about 95°, or about 85° to about 95°.

In some embodiments, the coated substrate 10 has a particular abrasion resistance as measured by the water angle after a certain number of cycles, as described in the Examples. Illustratively, the coated substrate 10 may have a particular water angle after enduring about 1,500 cycles, about 3,000 cycles, or about 4,500 cycles, as described in the Examples. Illustratively, the post-abrasion water angle may be greater than about 40°, greater than about 50°, greater than about 55°, or greater than about 60°. In some embodiments, the post-abrasion water angle is about 40°, about 50°, about 55°, about 60°, about 65°, about 70°, about 75°, about 80°, or about 85° after 1,500 cycles, 3,000 cycles, or 4,500 cycles. In some embodiments, the post-abrasion water angle is in a range of about 40° to about 85°, about 50° to about 85°, about 50° to about 80°, or about 60° to about 80° after 1,500 cycles, 3,000 cycles, or 4,500 cycles. In some embodiments, the post-abrasion water angle after 1500 cycles is greater than about 55°, greater than about 65°, or about 55° to about 65°.

In some embodiments, the formulation 12 comprises an alkyl silane. In some embodiments, the formulation 12 comprises a POSS. In some embodiments, the formulation 12 comprises an alkyl silane and a POSS.

In some embodiments, the alkyl silane is of the formula $$(R^A)_3SiR^B,$$

wherein each $R^A$ is independently —$OC_1$-$C_6$ alkyl, —$OC_2$-$C_6$ alkenyl, or —$OC_2$-$C_6$ alkynyl; and $R^B$ is $C_1$-$C_{20}$ alkyl, $C_2$-$C_{20}$ alkenyl, or $C_2$-$C_{20}$ alkynyl; wherein each hydrogen atom in —$OC_1$-$C_6$ alkyl, —$OC_2$-$C_6$ alkenyl, —$OC_2$-$C_6$ alkynyl, $C_1$-$C_{20}$ alkyl, $C_2$-$C_{20}$ alkenyl, or $C_2$-$C_{20}$ alkynyl is independently optionally substituted with deuterium, halogen, —OH, —CN, —$OR^1$, —$CO_2H$, —$C(O)OR^1$, —$C(O)OC_1$-$C_{20}$—$PO_3H_2$, —$C(O)NH_2$, —$C(O)NH(C_1$-$C_6$ alkyl), —$C(O)N(C_1$-$C_6$ alkyl)$_2$, —$SC_1$-$C_6$ alkyl, —$S(O)C_1$-$C_6$ alkyl, —$S(O)_2C_1$-$C_6$ alkyl, —$S(O)NH(C_1$-$C_6$ alkyl), —$S(O)_2NH(C_1$-$C_6$ alkyl), —$S(O)N(C_1$-$C_6$ alkyl)$_2$, —$S(O)_2N(C_1$-$C_6$ alkyl)$_2$, —$NH_2$, —$NH(C_1$-$C_6$ alkyl), —$N(H)C_1$-$C_6$ alkyl-$NH_2$, —$N(H)C_1$-$C_6$ alkyl-Si(—$OC_1$-$C_6$ alkyl)$_3$, —$N(R^1)C_1$-$C_6$ alkyl-$N(R^1)C_1$-$C_6$ alkyl-Si(—$OC_1$-$C_6$ alkyl)$_3$, —$N(H)C_1$-$C_6$ alkyl-$OC_1$-$C_6$ alkyl-Si(—$OC_1$-$C_6$ alkyl)$_3$, —$N(H)C_1$-$C_6$ alkyl-$N(H)C_1$-$C_6$ alkyl-$NH_2$, —$P(C_1$-$C_6$ alkyl)$_2$, —$P(O)(C_1$-$C_6$ alkyl)$_2$, —$PO_3H_2$, or —Si(—$OC_1$-$C_6$ alkyl)$_3$; and wherein each hydrogen atom in $C_1$-$C_6$ alkyl of —$N(H)C_1$-$C_6$ alkyl-O—$C_1$-$C_6$ alkyl-Si(—$OC_1$-$C_6$ alkyl)$_3$ is optionally substituted with hydroxy; and wherein $R^1$ is independently deuterium, $C_1$-$C_6$ alkyl, $C_2$-$C_6$ alkenyl, $C_2$-$C_6$ alkynyl, $C_3$-$C_6$ cycloalkyl, or —$C_1$-$C_6$ alkyl-O—$C_1$-$C_6$ alkyl, wherein each hydrogen atom in $C_1$-$C_6$ alkyl is optionally substituted with hydroxy. In some embodiments, $R^A$ is —$OC_1$-$C_6$ alkyl. In some embodiments, $R^B$ is $C_{10}$-$C_{20}$ alkyl, $C_{10}$-$C_{20}$ alkenyl, or $C_{10}$-$C_{20}$ alkynl wherein each hydrogen atom in $C_{10}$-$C_{20}$ alkyl, $C_{10}$-$C_{20}$ alkenyl, or $C_{10}$-$C_{20}$ alkynl is optionally substituted with halo. In some embodiments, $R^B$ is not a halo-substituted n-octyltriethoxysilane or a halo-substituted $C_1$-$C_6$ alkyl. In some embodiments, $R^B$ is not a fluoro-substituted n-octyltriethoxysilane or a fluoro-substituted $C_1$-$C_6$ alkyl.

In some embodiments, $R^B$ is $C_1$-$C_{20}$ alkyl, $C_6$-$C_{20}$ alkyl, or $C_{10}$-$C_{20}$ alkyl wherein each hydrogen atom $C_1$-$C_{20}$ alky, $C_6$-$C_{20}$ alkyl, or $C_{10}$-$C_{20}$ alkyl is optionally substituted. In some embodiments, each hydrogen atom may be independently optionally substituted by halogen, —OH, —CN, —$OR^1$, —$CO_2H$, —$NH_2$, —$NH(C_1$-$C_6$ alkyl), —$N(C_1$-$C_6$ alkyl)$_2$, —$P(C_1$-$C_6$ alkyl)$_2$, —$P(O)(C_1$-$C_6$ alkyl)$_2$, —$PO_3H_2$, wherein $R^1$ is independently deuterium or —$C_1$-$C_6$alkyl-O—$C_1$-$C_6$ alkyl. Illustratively, the halogen may be chloro, bromo, or iodo. In some embodiments, the alkyl silane comprises a halogen, such as a chloroalkyl silane, but does not comprise a fluoro. Illustratively, a chloroalkyl silane can comprise $C_1$-$C_{20}$ alkyl where at least one hydrogen atom is $C_1$-$C_{20}$ alkyl is substituted with chloro. In some embodiments, the alkyl silane does not comprise a PEG group. In some embodiments, the chloroalkylsilane is a chloroundecyl silane.

In some embodiments, the alkyl silane is selected from group consisting of (chloroundecyl)(triethoxy)silane, (chloroundecyl)(trimethoxy)silane, (chlorohexyl)(triethoxy)silane, (chlorohexyl)(trimethoxy)silane, 11-(2-methoxyethoxy)undecyltrimethoxyslane, (aminoundecyl)(triethoxy)silane, (aminoundecyl)(trimethoxy)silane, (hydoxydecyl)(triethoxy)silane, (hydoxydecyl)(trimethoxy)silane, (11-undecylinicacid)(triethoxy)silane, (hydroxyheptyl)(triethoxy) silane, (hydroxyundecyl)(triethoxy)silane, and (11-phosphoundecyl)(triethoxy)silane.

In some embodiments, the POSS is of the formula

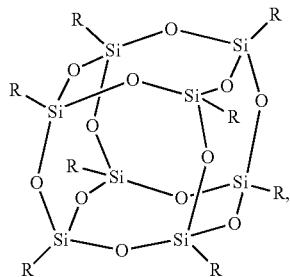

wherein R is —$C_1$-$C_6$ alkyl, -$A^E$-O—$B^F$—$C^G$—O-$D^H$, or —O—Si($C_1$-$C_6$ alkyl)$_3$, wherein A is $C_1$-$C_6$ alkyl, B is —$C_1$-$C_6$ alkyl-O—, C is $C_1$-$C_6$ alkyl, D is $C_1$-$C_6$ alkyl, O is oxygen, each of E, G, and H is at least 1, and F is an integer from 5 to 12, and wherein each hydrogen atom in —$C_1$-$C_6$ alkyl is independently optionally substituted with deuterium, halogen, —OH, —CN, —$OR^2$, —$OC_1$-$C_6$ alkyl, —$NH_2$, —$NH(C_1$-$C_6$ alkyl), —$N(H)C_1$-$C_6$ alkyl-$NH_2$, —$N(C_1$-$C_6$ alkyl)$_2$, —$P(C_1$-$C_6$ alkyl)$_2$, —$P(O)(C_1$-$C_6$ alkyl)$_2$, or —$OPO_3H$; and wherein $R^2$ is independently deuterium, $C_2$-$C_6$ alkenyl, $C_2$-$C_6$ alkynyl, $C_3$-$C_6$ cycloalkyl, or —$C_1$-$C_6$ alkyl-O—$C_1$-$C_6$ alkyl. In some embodiments, R is-$A^E$-O—$B^F$—$C^G$—O-$D^H$ or —O—Si($C_1$-$C_6$ alkyl)$_3$. In some embodiments, R is -$A^E$-O—$B^F$—$C^G$—O-$D^H$. In some embodiments, R is —$(CH_2)_3O(CH_2CH_2O)_9CH_2CH_2OCH_3$. In some embodiments, R is —O—Si$(CH_2)_2CH_2CH_2CH_2OH$. Exemplary POSS are made according to Example 1 in US Patent Application Publication No. 2017/0349785, or may be purchased from Sigma Aldrich under the CAS number 288290-32-4. In some embodiments, R is $C_1$-$C_6$ alkyl or —O—Si—$(C_1$-$C_6$ alkyl)$_3$ and at least one $C_1$-$C_6$ alkyl is substituted with at least one hydroxy.

In some embodiments, the formulation 12 comprises a solvent. In some embodiments, the solvent comprises water, an alcohol, or a mixture thereof. In some embodiments, the alcohol is a $C_1$-$C_6$ alkyl-OH. In some embodiments, the solvent is methanol, ethanol, propanol, butanol, pentanol, hexanol, or a combination thereof.

In some embodiments, the solvent is at an acidic pH. In some embodiments, the solvent is at a pH of about 1 to about 7. In some embodiments, the pH is about 1, about 2, about 3, about 4, about 5, about 6, or about 7. In some embodiments, the pH is about 1 to about 6, about 2 to about 6, or about 2 to about 5. Illustratively, the solvent can be acidified with an acid. In some embodiments, the acid is nitric acid, although other acids capable of accomplishing the desired pH can be used.

In some embodiments, the formulation 12 comprises additives. In some embodiments, the formulation 12 comprises an adhesion promoter. In some embodiments, the formulation comprises an alkoxy adhesion promoter.

It is to be understood that in the present disclosure, the term "invisible" includes not visible, invisible, nearly invisible or inconspicuous (e.g., not visible unless the surface is scrutinized). It is to be understood that "invisibility" also depends, to an extent, on the refraction of the light and on the way one views the surface. From some angles a fingerprint may be invisible, while at other angles it may be discernable. The term "wettability" means the property whereby polar or non-polar liquids adhere to a substrate, forming an undesirable film, and also the tendency of a substrate to retain dust or dirt of all kinds, fingerprints, insects, etc.

Although only a number of exemplary embodiments have been described in detail above, those skilled in the art will readily appreciate that many modifications are possible in the exemplary embodiments without materially departing from the novel teachings and advantages. Accordingly, all such modifications are intended to be included within the scope of this disclosure as defined in the following claims.

EXAMPLES

The following examples are set forth for purposes of illustration only. Parts and percentages appearing in such examples are by weight unless otherwise stipulated.

General Methods

Reagents used in the following Examples are commercially available from vendors such as Sigma Aldrich or Gelest unless otherwise indicated. The POSS is available from Hybrid Plastics unless otherwise indicated. The glass used as a substrate in the following examples was Gorilla Glass® available from Corning®.

Example 1

A formulation for a coating comprising 2.7 g of chloroundecyl triethoxy silane and 100 mg hydroxy terminated POSS were dissolved in one liter of ethanol. The solution was acidified to pH 3 with 70% aqueous nitric acid and loaded into a commercially spray machine (Model Thurnder Origin Enterprise AF-7900). The flow rates, atomization pressures, nozzle distance, nozzle travel distance, and nozzle speed as shown in Table 1.

TABLE 1

Application Parameters

| Run | Main agent (ml/min) | Rate (g/30 sec) | Atomization pressure (kPa) | Nozzle distance (cm) | Nozzle travel distance (mm) | Nozzle Speed (mm/sec) |
|---|---|---|---|---|---|---|
| 1 | 7.5 | 9 | 70 | 3 | 640 | 750 |
| 2 | 15 | 4.5 | 70 | 3 | 640 | 750 |
| 3 | 15 | 4.5 | 70 | 8 | 640 | 750 |
| 4 | 7.5 | 9 | 70 | 3 | 640 | 750 |
| 5 | 15 | 4.5 | 70 | 3 | 640 | 750 |
| 6 | 7.5 | 4.5 | 70 | 5 | 640 | 750 |
| 7 | 5 | 4.5 | 70 | 5 | 640 | 750 |
| 8-0 | 7.5 | 9 | 70 | 10 | 640 | 750 |
| 8-1 | 7.5 | 9 | 70 | 10 | 640 | 750 |
| 9-0 | 7.5 | 9 | 70 | 10 | 640 | 750 |
| 9-1 | 7.5 | 9 | 70 | 10 | 640 | 750 |
| 10 | 7.5 | 9 | 70 | 10 | 640 | 750 |
| 11 | 15 | 4.5 | 70 | 5 | 640 | 750 |
| 12 | 10 | 4.5 | 70 | 5 | 640 | 750 |
| 13 | 10 | 4.5 | 70 | 5 | 640 | 750 |
| 14 | 15 | 4.5 | 70 | 10 | 640 | 750 |
| 15 | 15 | 4.5 | 70 | 10 | 640 | 750 |
| 16 | 15 | 4.5 | 70 | 5 | 640 | 500 |
| 17 | 15 | 4.5 | 70 | 5 | 640 | 500 |
| 18 | 15 | 4.5 | 150 | 5 | 640 | 750 |
| 19 | 10 | 4.5 | 150 | 10 | 640 | 750 |
| 20 | 10 | 4.5 | 250 | 10 | 640 | 750 |
| 21 | 7.5 | 4.5 | 150 | 10 | 640 | 750 |
| 22 | 7.5 | 4.5 | 250 | 10 | 640 | 750 |
| 23 | 10 | 3.5 | 150 | 10 | 640 | 750 |

After spraying the substrates, the coated substrate was treated as shown in Table 2. Some examples were baked in the oven. Some examples were cleaned.

TABLE 2

Treatment Parameters

| Run | Treatment after coating | | |
|---|---|---|---|
| 1 | Oven | Conveyor cleaning | Conveyor cleaning |
| 2 | Oven | Conveyor cleaning | Conveyor cleaning |
| 3 | Oven | Conveyor cleaning | Conveyor cleaning |
| 4 | Oven | Conveyor cleaning | Ultrasonic cleaning |
| 5 | Oven | Conveyor cleaning | Ultrasonic cleaning |
| 6 | Oven | Conveyor cleaning | Ultrasonic cleaning |
| 7 | Oven | Conveyor cleaning | Ultrasonic cleaning |
| 8 | Oven | Conveyor cleaning | Ultrasonic cleaning |
| 8-1 | Oven | Conveyor cleaning | Ultrasonic cleaning |
| 9 | Oven | Conveyor cleaning | Ultrasonic cleaning |
| 9-1 | Oven | Conveyor cleaning | Ultrasonic cleaning |
| 10 | Oven | Conveyor cleaning | / |
| 11 | Conveyor cleaning | Oven | Conveyor cleaning |
| 12 | Conveyor cleaning | Oven | Conveyor cleaning |
| 13 | Oven | Ultrasonic cleaning | Conveyor cleaning |
| 14 | Conveyor cleaning | Oven | Conveyor cleaning |
| 15 | Oven | Ultrasonic cleaning | Conveyor cleaning |
| 16 | Conveyor cleaning | Oven | Conveyor cleaning |
| 17 | Oven | Ultrasonic | Conveyor cleaning |
| 18 | Oven | Conveyor cleaning | / |
| 19 | Oven | Conveyor cleaning | / |
| 20 | Oven | Conveyor cleaning | / |
| 21 | Oven | Conveyor cleaning | / |
| 22 | Oven | Conveyor cleaning | / |

The treated samples from Table 2 were analyzed to determine the water contact angle, as shown in Table 3. After measuring the water contact angle, the coated substrates were subjected to 3,000 cycles of abrasion. The water contact angle was remeasured after the abrasion cycle and the post-abrasion angle is shown in Table 3.

TABLE 3

Contact Angles

| | Sample 1 | | Sample 2 | |
|---|---|---|---|---|
| Run | Water Contact Angle (°) | After abrasion test (°) | Water Contact Angle (°) | After abrasion test (°) |
| 1 | 87.43 | 61.37 | 83.69 | 47.56 |
| 2 | 87.42 | 68.34 | 85.1 | 73.22 |
| 3 | 84.21 | 69.98 | 85.64 | 71.09 |
| 4 | 91.65 | 49.33 | 84.92 | 54.27 |
| 5 | 82.63 | 76.02 | 90.67 | 60.67 |
| 6 | 72.64 | 60.3 | 70.34 | 50.56 |
| 7 | 71.25 | 53.64 | 71.18 | 51.31 |
| 8-0 | 81.13 | 71.46 | 88.57 | 66.24 |
| 8-1 | 80.3 | 73.38 | 80.73 | 43.52 |
| 9-0 | 83.12 | 74.89 | 88.96 | 75.11 |
| 9-1 | 77.87 | 58.57 | 91.09 | 65.64 |
| 10 | 88.32 | 53.15 | 87.79 | 73.76 |
| 11 | 86.4 | 53.42 | 79.62 | 79.35 |
| 12 | 78.28 | 67.64 | 78.97 | 52.43 |
| 13 | 80.45 | 75.1 | 67.29 | 45.52 |
| 14 | 78.94 | 63.17 | 82.17 | 50.51 |
| 15 | 94.52 | 56.34 | 95.01 | 54.73 |
| 16 | 80.41 | 80.06 | 82.14 | 59.02 |
| 17 | 91.04 | 51.74 | 93.58 | 57.83 |
| 18 | 94.65 | 59.58 | 93.16 | 58.6 |
| 19 | 96.55 | 63.7 | 95.45 | 63.34 |
| 20 | 90.68 | 55.65 | 92.29 | 56.68 |
| 21 | 93.63 | 56.35 | 93.02 | 62.88 |
| 22 | 93.61 | 62.39 | 92.63 | 60.75 |
| 23 | 92.91 | 58.72 | 91.92 | 60.95 |

The diiodomethane contact angle was also measured for surfaces according to this Example. The diiodomethane contact angle was found to be about 35° to about 40°.

While the methods, equipment, and systems have been described in connection with specific embodiments, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect.

As used in the specification and the appended claims, the singular forms "a," "an" and "the" include plural referents unless the context clearly dictates otherwise.

Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where the event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods, equipment and systems. These and other components are disclosed herein, and it is understood that when combinations, subsets, interactions, groups, etc., of these components are disclosed that while specific reference of each various individual and collective combinations and permutation of these may not be explicitly disclosed, each is specifically contemplated and described herein, for all methods, equipment and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

It should further be noted that any patents, applications and publications referred to herein are incorporated by reference in their entirety.

What is claimed is:

1. A process for forming a coating on a substrate, the process comprising,
    (a) providing a substrate having a substrate surface;
    (b) providing a formulation comprising a halogenated alkyl silane and a solvent;
    (c) atomizing the formulation with a nozzle at an atomization pressure of about 150 kPa to about 300 kPa and at a flow rate of about 1 ml/min to about 50 ml/min to form an atomized formulation; and
    (d) applying the atomized formulation to the substrate surface at a distance of about 8 cm to about 50 cm from the nozzle,
    wherein the coating has a water contact angle less than 100°; and
    wherein the halogenated alkyl silane is of the formula $$(R^A)_3SiR^B,$$

wherein each $R^A$ is independently —$OC_1$-$C_6$ alkyl, —$OC_2$-$C_6$ alkenyl, or —$OC_2$-$C_6$ alkynyl; and
$R^B$ is $C_1$-$C_{20}$ alkyl, $C_2$-$C_{20}$ alkenyl, or $C_2$-$C_{20}$ alkynyl.

2. The process of claim 1, wherein the substrate comprises glass, anti-reflective coated glass, adhesion-primed glass, metal, coated metal, plastic, or coated plastic.

3. The process of claim 1, wherein the coating is about 0.1 nm to about 500 nm thick.

4. The process of claim 1, wherein the coating is about 0.1 nm to about 100 nm thick.

5. The process of claim 1, the coating is about 0.1 nm to about 30 nm thick.

6. The process of claim 1, wherein the coating has a diiodomethane contact angle of less than 50°.

7. The process of claim 1, wherein the coating has a diiodomethane contact angle of about 25° to about 45°.

8. The process of claim 1, wherein the water contact angle is greater than 65°.

9. The process of claim 1, wherein the coating maintains a water contact angle above 50 degrees after 3,000 cycles of eraser abrasion.

10. The process of claim 1, wherein the halogenated alkyl silane is present in the formulation at about 0.1% to about 10% by weight of the formulation.

11. The process of claim 1, wherein the halogenated alkyl silane is present in the formulation at about 0.1% to about 5% by weight of the formulation.

12. The process of claim 1, wherein the halogenated alkyl silane is present in the formulation at about 0.1% to about 1% by weight of the formulation.

13. The process of claim 1, wherein the step of providing is performed at a flow rate of about 5 ml/min to about 20 ml/min.

14. The process of claim 1, wherein the step of providing is performed at a flow rate of about 8 ml/min to about 15 ml/min.

15. The process of claim 1, wherein the solvent comprises an alcohol.

16. The process of claim 1, wherein the solvent is ethanol.

* * * * *